(12) United States Patent
Liang et al.

(10) Patent No.: US 9,904,392 B2
(45) Date of Patent: Feb. 27, 2018

(54) TOUCH DISPLAY SCREEN, A MANUFACTURING METHOD THEREOF AND A DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Kui Liang, Beijing (CN); Bin Feng, Beijing (CN); Yao Liu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/511,588

(22) PCT Filed: Apr. 12, 2016

(86) PCT No.: PCT/CN2016/079030
§ 371 (c)(1),
(2) Date: Mar. 15, 2017

(87) PCT Pub. No.: WO2016/202065
PCT Pub. Date: Dec. 22, 2016

(65) Prior Publication Data
US 2017/0285821 A1 Oct. 5, 2017

(30) Foreign Application Priority Data
Jun. 19, 2015 (CN) .......................... 2015 1 0347720

(51) Int. Cl.
*G06F 3/041* (2006.01)
*G02F 1/1343* (2006.01)

(52) U.S. Cl.
CPC .......... *G06F 3/0412* (2013.01); *G02F 1/1343* (2013.01); *G06F 2203/04103* (2013.01)

(58) Field of Classification Search
CPC ........ G06F 3/041–3/047; G06F 3/0412; G06F 2203/04103; G02F 1/13338; G02F 1/1343;
(Continued)

(56) References Cited

U.S. PATENT DOCUMENTS

| | | | |
|---|---|---|---|
| 2009/0096759 A1* | 4/2009 | Nishiwaki | G06F 3/041 345/173 |
| 2010/0214247 A1 | 8/2010 | Tang et al. | |

(Continued)

FOREIGN PATENT DOCUMENTS

| | | |
|---|---|---|
| CN | 102841466 A | 12/2012 |
| CN | 103278955 A | 9/2013 |

(Continued)

OTHER PUBLICATIONS

International Search Report and Written Opinion in PCT/CN2016/079030 dated Jun. 27, 2016, with English translation. 17 pages.

(Continued)

*Primary Examiner* — A. Dexter Tugbang
*Assistant Examiner* — Kaying Kue
(74) *Attorney, Agent, or Firm* — Womble Bond Dickinson (US) LLP (57) ABSTRACT

This disclosure discloses a touch display screen, a manufacturing method thereof and a display device. The touch display screen comprises: an opposite substrate, an array substrate, and a liquid crystal layer located between the opposite substrate and the array substrate, a side of the opposite substrate facing the liquid crystal layer being provided with a black matrix. The touch display screen further comprises: a first touch electrode, an insulating layer (Continued)

and a second touch electrode arranged in stack successively at a side of the opposite substrate back to the liquid crystal layer. The first touch electrode and the second touch electrode are located within an area corresponding to the black matrix respectively. The first touch electrode comprises a plurality of first touch sub-electrodes distributed along a first direction. The second touch electrode comprises a plurality of second touch sub-electrodes distributed along a second direction perpendicular to the first direction.

12 Claims, 4 Drawing Sheets

(58) Field of Classification Search
CPC ......... Y10T 29/49126; Y10T 29/49128; Y10T 29/49155; Y10T 29/49105; H05K 3/36; H05K 3/368; H05K 3/361; H05K 3/46
See application file for complete search history.

(56) References Cited

U.S. PATENT DOCUMENTS

| | | | | |
|---|---|---|---|---|
| 2010/0321621 | A1* | 12/2010 | Kikuchi | G06F 3/044 349/122 |
| 2011/0074729 | A1* | 3/2011 | Im | G06F 3/0412 345/174 |
| 2011/0134060 | A1* | 6/2011 | Sung | G06F 3/0412 345/173 |
| 2011/0267289 | A1* | 11/2011 | Park | G06F 3/044 345/173 |
| 2012/0062486 | A1 | 3/2012 | Rho | |
| 2012/0086661 | A1* | 4/2012 | Shi | G06F 3/041 345/173 |
| 2012/0105337 | A1* | 5/2012 | Jun | G06F 3/0412 345/173 |
| 2013/0278544 | A1* | 10/2013 | Cok | G06F 3/044 345/174 |
| 2013/0293792 | A1* | 11/2013 | You | G06F 3/044 349/12 |
| 2014/0104510 | A1* | 4/2014 | Wang | G06F 3/0412 349/12 |
| 2014/0159067 | A1* | 6/2014 | Sakariya | H01L 24/24 257/88 |
| 2014/0333582 | A1 | 11/2014 | Huo | |

FOREIGN PATENT DOCUMENTS

| | | |
|---|---|---|
| CN | 203299800 | 11/2013 |
| CN | 203422726 U | 2/2014 |
| CN | 104484075 A | 4/2015 |
| CN | 104881178 A | 9/2015 |

OTHER PUBLICATIONS

Office Action in Chinese Application No. 201510347720.X dated May 22, 2017, with English translation.
Chinese Office Action with English Language Translation, dated Dec. 5, 2017, Chinese Application No. 201510347720.X.

\* cited by examiner

TOUCH DISPLAY SCREEN, A MANUFACTURING METHOD THEREOF AND A DISPLAY DEVICE

RELATED APPLICATIONS

The present application is the U.S. national phase entry of PCT/CN2016/079030, with an international filing date of Apr. 12, 2016, which claims the benefit of Chinese Patent Application No. 201510347720.X, filed on Jun. 19, 2015, the entire disclosures of which are incorporated herein by reference.

FIELD

This disclosure relates to the field of display technology, particularly to a touch display screen, a manufacturing method thereof and a display device.

BACKGROUND

With rapid development of the display technology, the touch panel has spread all over people's life gradually. The touch panel can be divided into Add on Mode Touch Panel, On Cell Touch Panel and In Cell Touch Panel according to the composition structure.

At present, a screen with the Add on Mode Touch Panel is a liquid crystal display screen with the touch function constituted by producing the touch screen and the liquid crystal display screen separately and then fitting them together. The completion of an entire screen with Add on Mode Touch Panel needs several turnovers of the primary product and two or more processing, and the manufacturing process is complex. Hence, in addition to the relatively high overall turnover cost and the processing cost, because the touch screen and the liquid crystal display screen are not integral, the precision problem exists when the two are fitted on a particular product line. Moreover, in the touch screen, the indium tin oxide (ITO) is generally used as the material of the touch driving electrode and the touch sensing electrode and they are manufactured on the protective glass. In such a way, although the transparency of the ITO can be utilized without considering the wiring position thereof, in fact, the ITO may result in absorption and reflection to the emitted light from the liquid crystal display screen, and the problems of high light reflectivity and low transmissivity may occur. In addition, due to the influence of the air gap between the liquid crystal display screen and the protective glass and the material of the glass, the light transmissivity will be reduced. Moreover, the thickness, the quality and the use cost of the product will also be increased by using the protective glass.

SUMMARY

This disclosure provides a touch display screen, a manufacturing method thereof and a display device, which can increase the light transmissivity, fitting precision and product yield.

According to an aspect of this disclosure, a touch display screen is provided, comprising: an opposite substrate, an array substrate, and a liquid crystal layer located between the opposite substrate and the array substrate, a side of the opposite substrate facing the liquid crystal layer being provided with a black matrix. The touch display screen further comprises:

a first touch electrode, an insulating layer and a second touch electrode arranged in stack successively at a side of the opposite substrate back to the liquid crystal layer.

The first touch electrode is located within an area corresponding to the black matrix. The first touch electrode comprises a plurality of first touch sub-electrodes distributed along a first direction.

The second touch electrode is located within the area corresponding to the black matrix. The second touch electrode comprises a plurality of second touch sub-electrodes distributed along a second direction perpendicular to the first direction.

Optionally, the touch display screen further comprises: a polarizer located above the second touch electrode.

Optionally, in the touch display screen, a line width of each of the first touch sub-electrodes and/or the second touch sub-electrodes is less than or equal to a line width of the black matrix.

Optionally, in the touch display screen, the line width of each of the first touch sub-electrodes and/or the second touch sub-electrodes is 5 microns to 20 microns.

Optionally, the touch display screen further comprises: a protective layer located between the polarizer and the second touch electrode. The material of the protective layer can be PET, PMMA or a polarizing film material.

Optionally, in the touch display screen, the first touch electrode is a touch driving electrode, the second touch electrode is a touch sensing electrode; or, the first touch electrode is a touch sensing electrode, the second touch electrode is a touch driving electrode.

Optionally, in the touch display screen, a material of the first touch electrode is a transparent conductive oxide or a metal material; and/or a material of the second touch electrode is a nano conductive ink material.

According to another aspect of this disclosure, a manufacturing method of a touch display screen is provided, comprising: forming a pattern of an opposite substrate having a black matrix and a pattern of an array substrate respectively, applying assembling process to the opposite substrate and the array substrate. The manufacturing method further comprises:

prior to applying the assembling process:
forming a pattern of a first touch electrode at another side of the opposite substrate opposite to a side where the black matrix locates; the first touch electrode being arranged within an area corresponding to the black matrix; the first touch electrode comprising a plurality of first touch sub-electrodes distributed along a first direction;
forming a pattern of an insulating layer on the first touch electrode;
after applying the assembling process:
forming a pattern of a second touch electrode on the insulating layer through nano conductive ink process; the second touch electrode being located within the area corresponding to the black matrix; the second touch electrode comprising a plurality of second touch sub-electrodes distributed along a second direction perpendicular to the first direction.

Optionally, the manufacturing method further comprises: after forming the pattern of the second touch electrode, forming a pattern of a polarizer on the second touch electrode.

Optionally, the manufacturing method further comprises: after forming the pattern of the second touch electrode and prior to forming the pattern of the polarizer, forming a pattern of a protective layer on the second touch electrode.

According to a further aspect of this disclosure, a display device is provided, comprising any touch display screen stated above.

Since the first touch electrode and the second touch electrode arranged in the touch display screen are located at a side of the opposite substrate back to the liquid crystal layer respectively and are located within an area corresponding to the black matrix respectively, it can not only reduce light reflection and light absorption and increase the light transmissivity, but also can improve fitting precision and product yield.

DETAILED DESCRIPTION

Next, the specific implementations of the touch display screen, the manufacturing method thereof and the display device provided by embodiments of this disclosure will be explained in detail.

The thicknesses and shapes of respective films in the drawings do not reflect the real proportion of the touch display screen, which only aim to explaining the content of this disclosure schematically.

Figure 1:
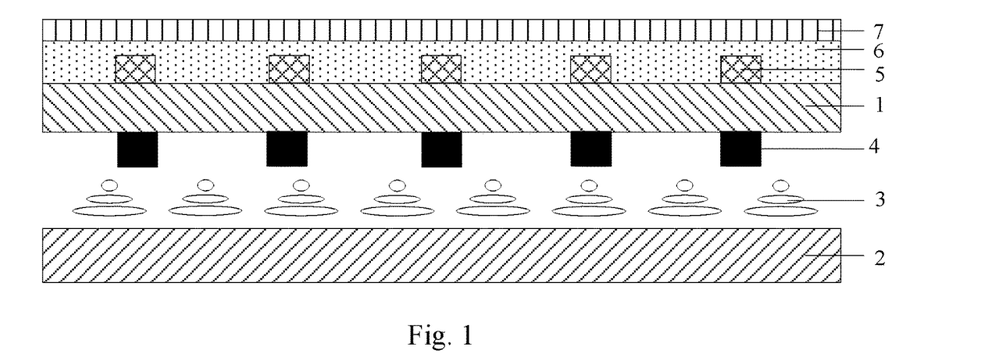
FIG. 1 is a structural schematic view of a touch display screen according to an embodiment of this disclosure.
Figure 2:
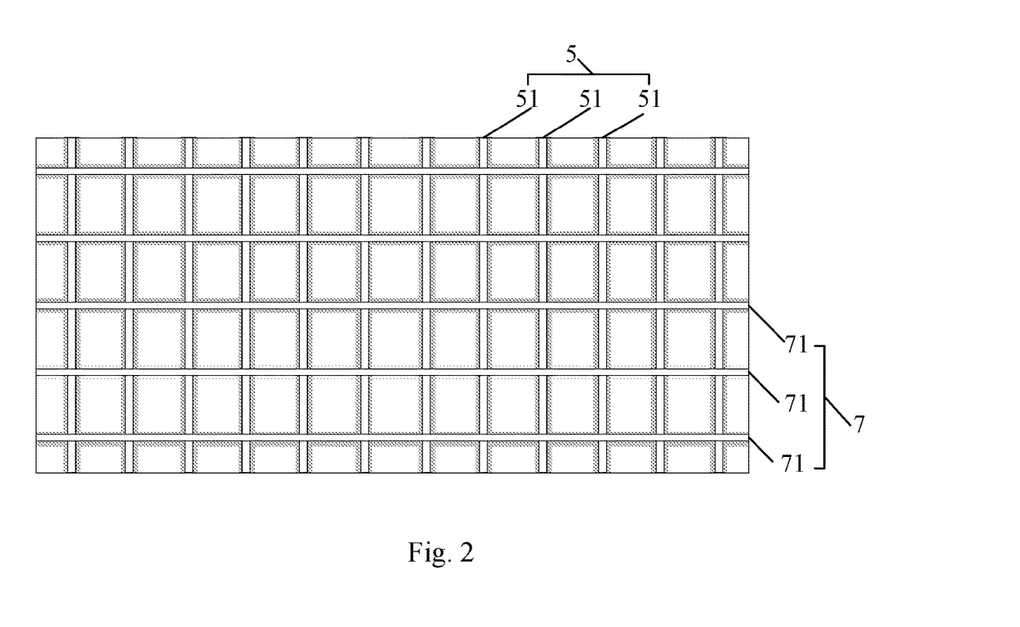
FIG. 2 is a vertical view of a touch display screen according to an embodiment of this disclosure.

Embodiments of this disclosure provide a touch display screen, as shown in FIG. 1 and FIG. 2, comprising: an opposite substrate 1, an array substrate 2, and a liquid crystal layer 3 located between the opposite substrate 1 and the array substrate 2, a side of the opposite substrate 1 facing the liquid crystal layer 3 being provided with a black matrix 4. The touch display screen further comprises:

a first touch electrode 5, an insulating layer 6 and a second touch electrode 7 arranged in stack successively at a side of the opposite substrate 1 back to the liquid crystal layer 3.

The first touch electrode 5 is located within an area corresponding to the black matrix 4. The first touch electrode 5 comprises a plurality of first touch sub-electrodes 51 distributed along a first direction (only three of the first touch sub-electrodes are marked out in FIG. 2, other sub-electrodes distributed in the vertical direction are also first touch sub-electrodes).

The second touch electrode 7 is located within the area corresponding to the black matrix 4. The second touch electrode 7 comprises a plurality of second touch sub-electrodes 71 distributed along a second direction perpendicular to the first direction (only three of the second touch sub-electrodes are marked out in FIG. 2, other sub-electrodes distributed in the horizontal direction are also second touch sub-electrodes).

It should be noted that the first direction and the second direction in FIG. 2 are vertical direction and horizontal direction respectively, however, this is only an example shown for explaining this disclosure. In specific implementation, the first direction and the second direction are not limited to the vertical direction and the horizontal direction as shown in FIG. 2.

In the touch display screen, the strip shaped first touch electrode and second touch electrode arranged in the touch display screen are located within the area corresponding to the black matrix respectively. It can also be understood that they are located with the area covered by the pattern of the black matrix respectively, thus the light reflection and light absorption can be reduced, the emitted light would not be influenced greatly, and the transmissivity of the emitted light can be increased. In addition, because the touch system comprising the first touch electrode and the second touch electrode is arranged at a side of the opposite substrate back to the liquid crystal layer directly, the touch system and the opposite substrate can be fitted seamlessly, so as to improve the fitting precision and product yield.

Figure 3:
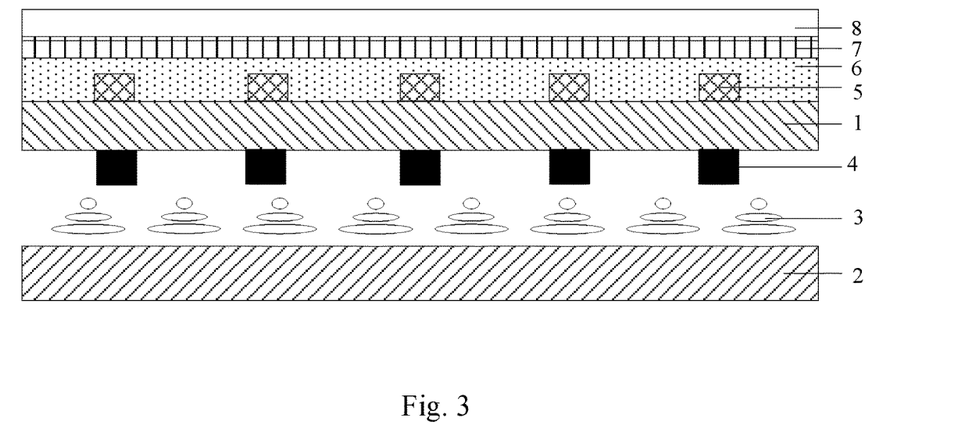
FIG. 3 is a structural schematic view of a touch display screen according to another embodiment of this disclosure.

In another embodiment, in order to enable the touch display screen to perform imaging, as shown in FIG. 3, the touch display screen can further comprise: a polarizer 8 located above the second touch electrode 7. Because the polarizer is arranged, a protective glass does not have to be arranged on the touch display screen, thereby reducing the number of the films, so as to reduce the product thickness, product weight and product cost. Meanwhile, the whole touch system can be protected by arranging the whole touch system between the opposite substrate and the polarizer.

In embodiments, since each of the first touch sub-electrodes and the second touch sub-electrodes is located within the area corresponding to the black matrix, as shown in FIG. 2, the line width of each of the first touch sub-electrodes 51 and the second touch sub-electrodes 71 can be less than or equal to the line width of the black matrix 4, which can further reduce the influence of the touch system to the transmissivity. Certainly, the line width of each of the first touch sub-electrodes and the second touch sub-electrodes can also be slightly greater than the line width of the black matrix, as long as it does not influence the transmissivity of the emitted light, which will not be defined here. It should be understood that the distribution positions and the distribution density of the first touch electrode and the second touch electrode can be set based on the requirement of the touch precision.

In embodiments, since the line width of the black matrix is about 5 microns to 20 microns generally, in order to ensure that the line width of each of the first touch sub-electrodes and the second touch sub-electrodes is not greater than the line width of the black matrix, the line width of each of the first touch sub-electrodes and the second touch sub-electrodes can be set as 5 microns to 20 microns specifically. It should be understood that the line width of each of the first touch sub-electrodes and the second touch sub-electrodes can be set based on actual conditions, which will not be defined here.

Figure 4:
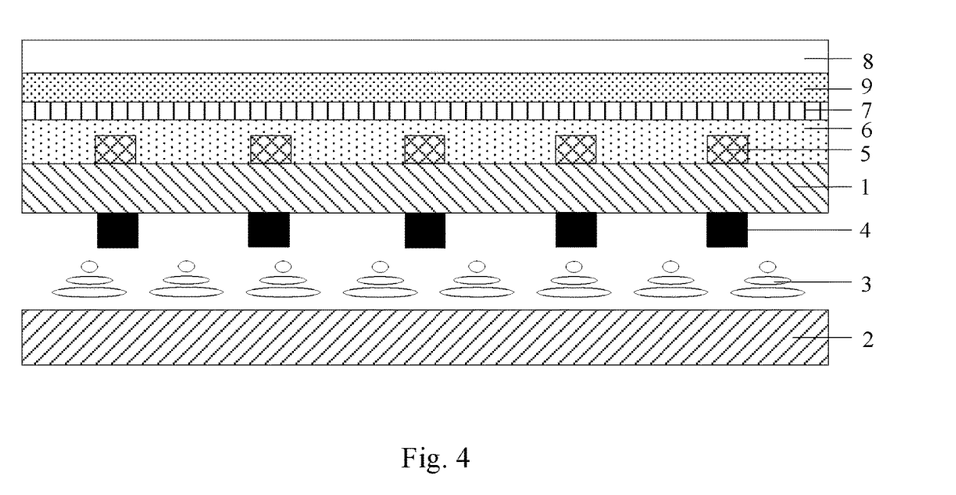
FIG. 4 is a structural schematic view of a touch display screen according to a further embodiment of this disclosure.

In another embodiment, as shown in FIG. 4, the touch display screen can further comprise: a protective layer 9 located between the polarizer 8 and the second touch electrode 7. The protective layer 9 plays the function of uniformity and planarization and the function of protecting the second touch electrode. Specifically, the material of the protective layer 9 can be one of the PET, the PMMA and the polarizing film material. These materials are all organic materials, hence, the protective layer can be fitted with the polarizer closely and seamlessly, so that the fitting precision is high, refitting is not required, and the light transmissivity will not be influenced substantially. Moreover, the transmissivity can be increased by more than 10% relative to the existing touch technology. As for the specific material of the protective layer, it can be set based on specific conditions, which will not be defined here.

As an example, in the touch display screen, the first touch electrode can be a touch driving electrode, the second touch electrode can be a touch sensing electrode; or, the first touch electrode can be a touch sensing electrode, the second touch electrode can be a touch driving electrode, which will not be defined here.

In the touch display screen, since the first touch electrode is located within the area corresponding to the black matrix, the case of blocking the display light will not occur. Hence, the material of the first touch electrode can be a transparent conductive oxide (e.g., ITO or IZO) specifically, or it can also be a metal material specifically. When the metal material is used to manufacture the first touch electrode, the resistance thereof can be reduced effectively. The material can be further transparent conductive materials such as carbon nano-tube, graphene specifically. In the production of the conventional liquid crystal panels, in order to prevent static electricity, a layer of ITO will be coated on the whole surface of the glass at the outer side of the opposite substrate generally, however, this may influence the transmissivity of the light. In the touch display screen of this disclosure, the conventional ITO conductive film is not required, instead, the ITO film is formed into the first touch electrode directly. Specifically, in order to increase the utilization function of this layer of ITO and increase the transmissivity of light, the ITO can be split into strips, manufactured in an area corresponding to the black matrix of the opposite substrate and serves as the first touch electrode. In this way, because the existing ITO process is used, the use of nano conductive ink process can be reduced, so that the process is reduced, and the cost is reduced. In addition, the material of the insulating layer is generally PMMA with large hardness or other organic films with good insulation and large hardness. The material of the second touch electrode can be nano conductive ink material (e.g., nano silver conductive ink with a grain size less than 50 nm or other conductive ink with high conductivity), which will not be defined here.

It should be pointed out that the touch display screen is adaptable for liquid crystal display panels of various modes. For example, it is adaptable for In-Plane Switch (IPS) and Advanced Super Dimension Switch (ADS) type liquid crystal display panels that can realize wide visual angle, and is adaptable for conventional Twisted Nematic (TN) type liquid crystal display panels, which will not be defined here.

As an example, in the touch display screen provided in embodiments of this disclosure, the opposite substrate can be further provided with other film structures such as a color film layer, a common electrode layer, a pixel electrode layer generally, and the array substrate can be further formed with structures such as thin film transistors, gate lines, data lines etc. These specific structures can be carried out in various ways, which will not be defined here.

Embodiments of this disclosure further provide a manufacturing method of a touch display screen. Because the principle of this method in solving problems is similar as the preceding touch display screen, the implementation of this method can make reference to the implementation of the touch display screen, which will not be repeated here.

Figure 5:
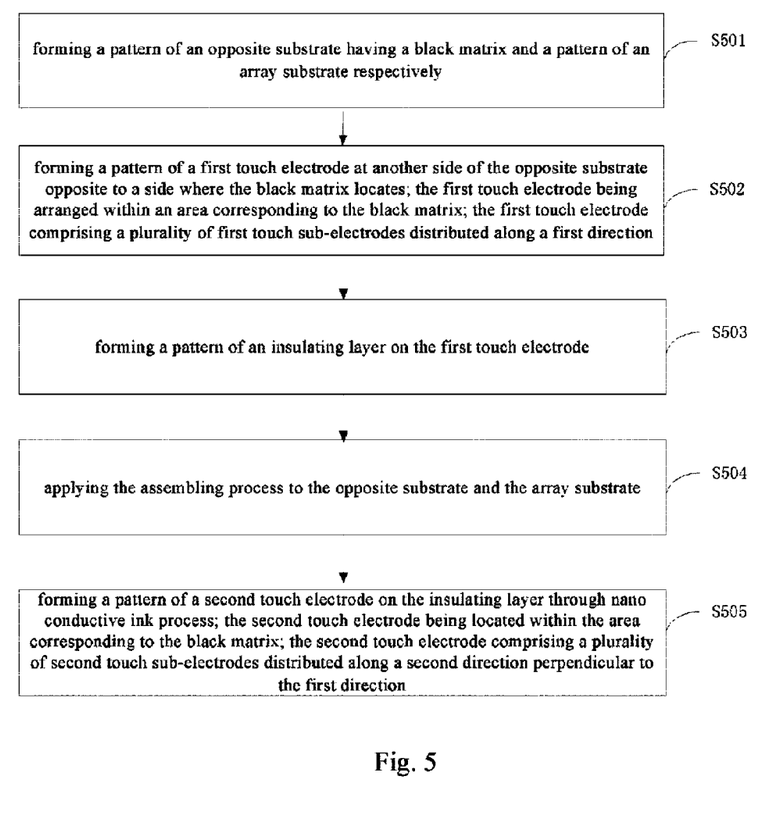
FIG. 5 is a flow chart of a manufacturing method of a touch display screen according to embodiments of this disclosure.

As an example, as shown in FIG. 5, the manufacturing method of a touch display screen provided by embodiments of this disclosure specifically comprises the steps of:

S501: forming a pattern of an opposite substrate having a black matrix and a pattern of an array substrate respectively;

S502: forming a pattern of a first touch electrode at another side of the opposite substrate opposite to a side where the black matrix locates; the first touch electrode being arranged within an area corresponding to the black matrix; the first touch electrode comprising a plurality of first touch sub-electrodes distributed along a first direction;

S503: forming a pattern of an insulating layer on the first touch electrode;

S504: applying the assembling process to the opposite substrate and the array substrate;

S505: forming a pattern of a second touch electrode on the insulating layer through nano conductive ink process; the second touch electrode being located within the area corresponding to the black matrix; the second touch electrode comprising a plurality of second touch sub-electrodes distributed along a second direction perpendicular to the first direction.

It should be noted that in one embodiment, after applying the assembling process to the opposite substrate and the array substrate at step S504, the base material of the product that is not split can be transported to the nano touch film product line directly for manufacturing the second touch electrode. In this way, the assembling process is applied before forming the second touch electrode, which is easy to operate, the process is simplified, and the production efficiency can be improved.

In one embodiment, the method can further comprise: after forming the first touch electrode at step S502 or after forming a pattern of the second touch electrode at step S505, performing wire detection and repair to the first touch electrode or the second touch electrode. It is checked whether there is broken wire, if yes, it should be repaired, thus the product yield can be increased further.

The patterning process in embodiments of this disclosure includes processes such as photoresist coating, masking, exposing, development, etching, photoresist stripping etc. The nano conductive ink process includes ink spraying, 3D printing technology etc. It should be noted that the conductive ink jet printing device used in the manufacturing process can be transformed from the orientation liquid coating device or from the spraying device in the color film process, and has independent control programs, wherein the spray nozzle can be 5 μm to 20 μm, the precision error is less than 10 μm, and the width of the coated wire is 5 μm to 20 microns, which can also be changed based on actual requirements. The high temperature sintering chamber can use the existing high temperature chamber of the Cell product line. The wire detection device can use the Array Test electrical detection device. The wire is repaired using the existing Array Repair device which is adaptively transformed slightly. The related cutting and polarizer fitting can be both accomplished in the existing product line. An automatic electrode processing device has to be added further.

In the manufacturing method of the touch display screen provided by embodiments of this disclosure, in order to not only save the protective glass externally arranged on the touch display screen so as to reduce the number of the films, but also protect the whole touch system, the method can further comprise: after forming the pattern of the second touch electrode at step S505, forming a pattern of a polarizer on the second touch electrode.

In order to protect the second touch electrode, the manufacturing method of the touch display screen provided by embodiments of this disclosure can further comprise: after forming the pattern of the second touch electrode and prior to forming the pattern of the polarizer on the second touch electrode, forming a pattern of a protective layer on the second touch electrode.

Figure 6A:
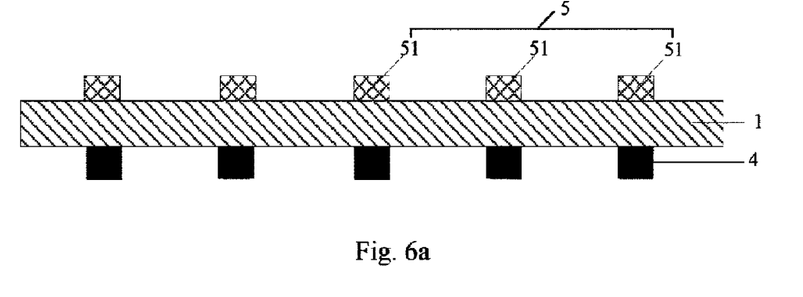
FIG. 6a to FIG. 6d are structural schematic views after respective steps of the manufacturing method of a touch display screen according to embodiments of this disclosure are performed.

Next, the manufacturing method of the touch display screen provided by embodiments of this disclosure will be explained in detail with a specific example, the specific steps are as follows:

Step I: forming a pattern of an opposite substrate with a black matrix and a patterning of an array substrate respectively;

Step II: forming a pattern of a first touch electrode at another side of the opposite substrate opposite to a side where the black matrix locates; the first touch electrode being arranged within an area corresponding to the black matrix; the first touch electrode comprising a plurality of first touch sub-electrodes distributed along a first direction; and performing wire detection and repair to the first touch electrode, as shown in FIG. 6a;

As an example, there are two kinds of materials that can be used by the patterning process: non-transparent conductive material and transparent conductive material. After performing exposing, developing and etching using the above conductive materials, a pattern of the first touch electrode located within an area corresponding to the pattern of the black matrix is formed. For example, a layer of ITO film can be plated on another side of the opposite substrate 1 opposite to a side where the black matrix 4 locates, and then strip shaped first touch sub-electrodes 51 distributed along a first direction are formed via exposure, development and etching, and the position of the first touch sub-electrode 51 corresponds to the position of the black matrix 4; after that, wire detection and repair is performed to the first touch electrode 5 comprising a plurality of first touch sub-electrodes 51, if there is broken wire, it should be repaired.

Figure 6B:
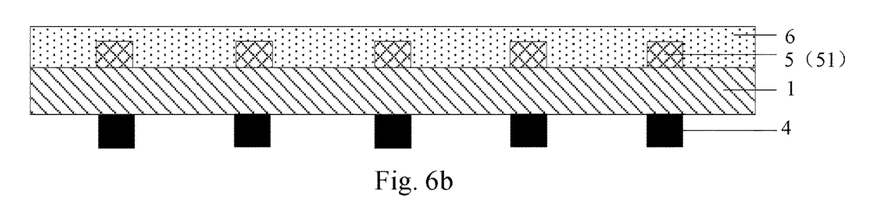

Step III: forming a pattern of an insulating layer on the first touch electrode, as shown in FIG. 6b;

As an example, an organic material film (e.g., a PMMA film) can be deposited on the first touch electrode 5 by sputtering as an insulating layer 6 for insulating the first touch electrode and the second touch electrode.

Figure 6C:
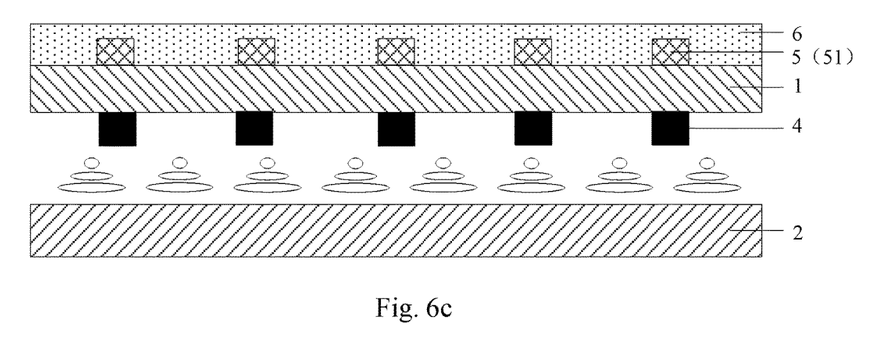

Step IV: applying assembling process to the opposite substrate and the array substrate, as shown in FIG. 6c;

As an example, the opposite substrate 1 and the array substrate 2 are transmitted to the Cell process and are manufactured, so as to accomplish the assembling process.

Figure 6D:
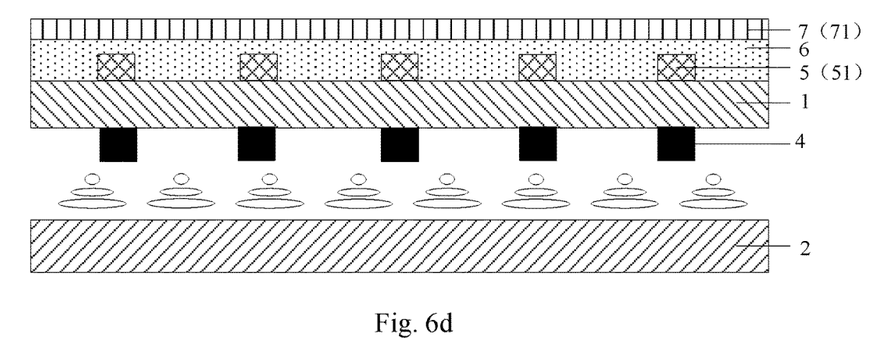

Step V: forming a pattern of the second touch electrode on the insulating layer through nano conductive ink process; the second touch electrode being located within the area corresponding to the black matrix; the second touch electrode comprising a plurality of second touch sub-electrodes distributed along a second direction perpendicular to the first direction; and performing wire detection and repair to the second touch electrode, as shown in FIG. 6d;

As an example, a layer of conductive ink is coated on the insulating layer 6, which is heated to 120° C.-160° C. to enable the nano conductive ink to be cured, so as to form a plurality of second touch sub-electrodes 71 along a second direction perpendicular to the first direction. Subsequently, wire detection and repair is performed to the second touch electrode 7 comprising a plurality of second touch sub-electrodes 71, if there is broken wire, it should be repaired.

The touch display screen provided by this disclosure can be manufactured through the steps I to V provided above.

Embodiments of this disclosure further provide a display device, comprising any touch display screen provided above. The display device can be any product or component with the display function such as a mobile phone, a panel computer, a television, a display, a laptop, a digital photo frame, a navigator etc. Other composite parts of the display device can all be commonly used in the art, which will not be repeated here and should not be taken as limitations to this disclosure either. The display device can be implemented by referring to the embodiments of the touch display screen, which will not be repeated.

Embodiments of this disclosure provide a touch display screen, a manufacturing method thereof and a display device. The touch display screen comprises: an opposite substrate, an array substrate, and a liquid crystal layer located between the opposite substrate and the array substrate, a side of the opposite substrate facing the liquid crystal layer being provided with a black matrix. The touch display screen further comprises: a first touch electrode, an insulating layer and a second touch electrode arranged in stack successively at a side of the opposite substrate back to the liquid crystal layer. The first touch electrode and the second touch electrode are located within an area corresponding to the black matrix respectively. The first touch electrode comprises a plurality of first touch sub-electrodes distributed along a first direction. The second touch electrode comprises a plurality of second touch sub-electrodes distributed along a second direction perpendicular to the first direction. The first touch electrode and second touch electrode arranged in the touch display screen are located within the area corresponding to the black matrix respectively. It can also be understood that they are located with the area covered by the pattern of the black matrix respectively. In this way, the light reflection and light absorption can be reduced, the emitted light would not be influenced greatly, and the transmissivity of the emitted light can be increased. In addition, because the touch system comprising the first touch electrode and the second touch electrode is arranged at a side of the opposite substrate back to the liquid crystal layer directly, the touch system and the opposite substrate can be fitted seamlessly, so as to improve the fitting precision and product yield.

Apparently, the skilled person in the art can make various modifications and variations to embodiments of the present invention without departing from the spirit and the scope of the present invention. In this way, provided that these modifications and variations of embodiments of the present invention fall within the scopes of the claims of the present invention and the equivalent technologies thereof, the present invention also intends to encompass these modifications and variations.

The invention claimed is:

1. A manufacturing method of a touch display screen, comprising: forming a pattern of a black matrix on an opposite substrate and a pattern on an array substrate respectively, applying an assembling process to the opposite substrate and the array substrate, wherein the manufacturing method further comprises:

prior to applying the assembling process,
forming a pattern of a first touch electrode on another side of the opposite substrate opposites to a side where the black matrix is located; the first touch electrode being arranged within an area corresponding to the black matrix; the first touch electrode comprising a plurality of first touch sub-electrodes distributed along a first direction;

forming a pattern of an insulating layer on the first touch electrode;

after applying the assembling process,
forming a pattern of a second touch electrode on the insulating layer through a nano conductive ink process;

the second touch electrode being located within an area of the touch display screen corresponding to the black matrix; the second touch electrode comprising a plurality of second touch sub-electrodes distributed along a second direction perpendicular to the first direction.

2. The manufacturing method according to claim 1, further comprising: after forming the pattern of the second touch electrode, forming a pattern of a polarizer on the second touch electrode.

3. The manufacturing method according to claim 1, further comprising: after forming the pattern of the second touch electrode and prior to forming the pattern of the polarizer, forming a pattern of a protective layer on the second touch electrode.

4. The manufacturing method according to claim 3, wherein a material of the protective layer is PET, PMMA or a polarizing film material.

5. The manufacturing method according to claim 1, wherein a line width of each of the first touch sub-electrodes is less than or equal to a line width of the black matrix.

6. The manufacturing method according to claim 5, wherein the line width of each of the first touch sub-electrodes is 5 microns to 20 microns.

7. The manufacturing method according to claim 1, wherein the first touch electrode is a touch driving electrode, and the second touch electrode is a touch sensing electrode.

8. The manufacturing method according to claim 1, wherein a material of the first touch electrode is a transparent conductive oxide or a metal material.

9. The manufacturing method according to claim 1, wherein a line width of each of the second touch sub-electrodes is less than or equal to a line width of the black matrix.

10. The manufacturing method according to claim 9, wherein the line width of each of the second touch sub-electrodes is 5 microns to 20 microns.

11. The manufacturing method according to claim 1, wherein the first touch electrode is a touch sensing electrode, and the second touch electrode is a touch driving electrode.

12. The manufacturing method according to claim 1, wherein a material of the second touch electrode is a nano conductive ink material.

* * * * *